Feb. 8, 1938.  J. ELIAN  2,107,980
METHOD FOR PREPARING IRON AND STEEL
Filed March 1, 1937  2 Sheets-Sheet 1

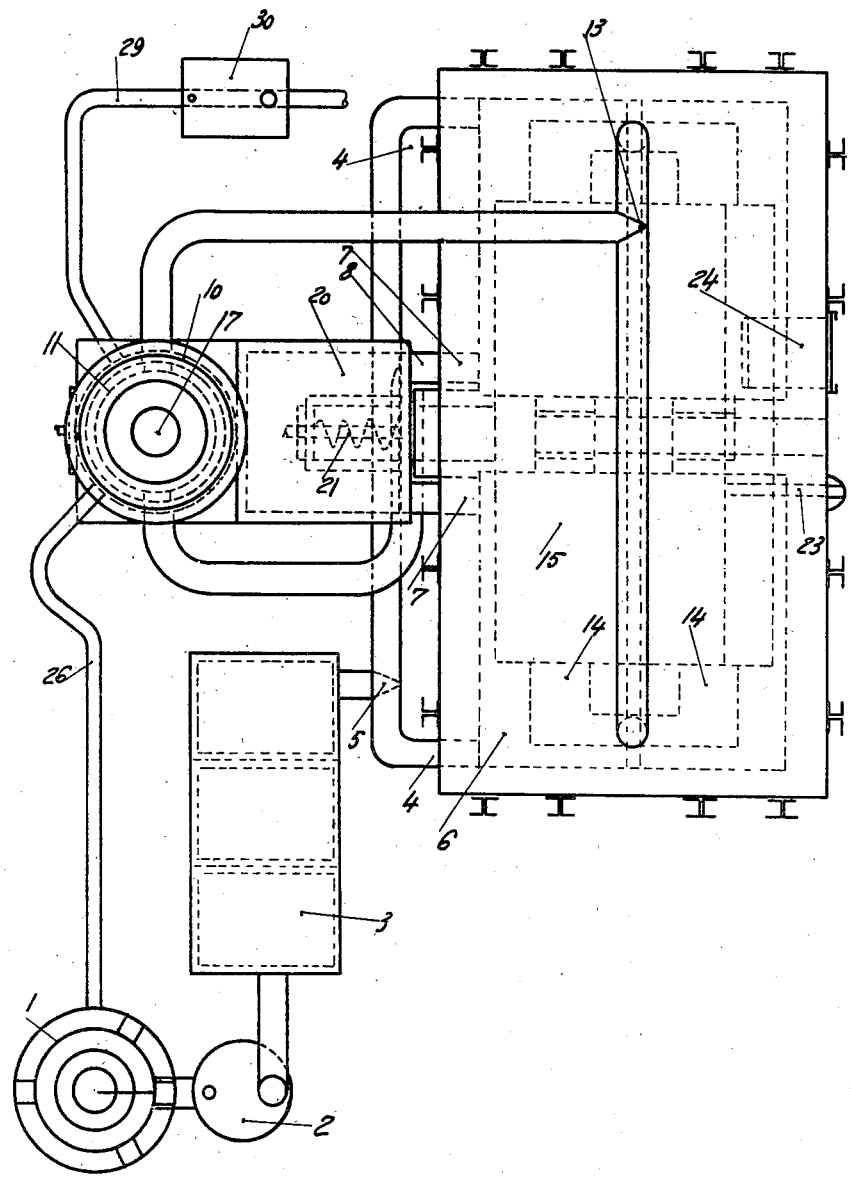

Patented Feb. 8, 1938

2,107,980

UNITED STATES PATENT OFFICE 2,107,980

METHOD FOR PREPARING IRON AND STEEL

John Elian, Paris, France

Application March 1, 1937, Serial No. 128,542
In Germany March 16, 1936

10 Claims. (Cl. 75—38)

It is known that under the action of hot carbon monoxide, hydrogen, or gases containing hydrocarbons, the oxides of iron are reduced to metallic iron in the form known as "spongy iron". It is likewise known that the spongy iron thus obtained which is composed of metallic iron and gangue, can be smelted in a Siemens-Martin furnace with the addition of charges which are necessary for producing a slag, yielding pure iron or steel and a liquid slag.

In practice, however, the production of steel through the intermediary of spongy iron is hindered by the poor thermic efficiency of this method which thus cannot compete with the blast furnace method although it may have considerable technical advantages.

It is an object of the present invention to provide a method for economically producing iron or steel through the intermediary of spongy iron; said method is characterized by the fact that the reducing gas is pre-heated in the recuperation chambers of the Siemens-Martin furnace to a temperature substantially equal to that for reducing the ore, and after passing through the reducing chamber, said gas is used as a fuel for heating the said furnace.

The reducing gas which is obtained in a gas generator is conveyed, after separation of the tar, which produces a cooling of the gas, into one of the recuperation or heating chambers of a Siemens-Martin furnace to be heated therein, while the other chamber of the furnace is heated in the known manner by the burnt gases of said furnace. In the pre-heating chamber, the gas is heated to the reducing temperature of the iron oxide of the ore, and is then conveyed into a reducing chamber through the layer of ore which moves downwards in the opposite direction to that of the displacement of the gas.

As is known, reduction begins for many ores at about 300° C., the rate of reduction increasing with the temperature. The reducing temperature has an upper limit of about 900 to 1200° C. above which a fritting of the spongy iron occurs, making it impervious to the gases. A part of the carbon monoxide and of the hydrogen of the reducer gas is oxidized during the reducing process by the oxygen of the iron oxide, yielding carbon dioxide and water vapour according to the following equations:

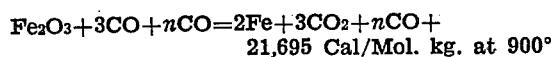
21,695 Cal/Mol. kg. at 900°
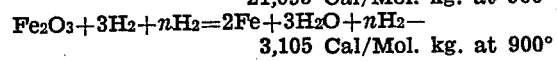
3,105 Cal/Mol. kg. at 900° or again:

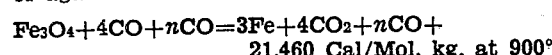
21,460 Cal/Mol. kg. at 900°
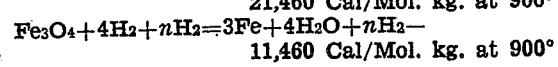
11,460 Cal/Mol. kg. at 900°

As these equations show, the reduction by carbon monoxide is exothermic so that it is not necessary to heat the reducing chamber; on the contrary, an additional heating occurs for example from 900 to 985° when no steps are taken for cooling. The reduction by hydrogen is on the contrary endothermic within the temperature limits mentioned. The reducing chamber therefore has to be heated. According to an embodiment of the invention, the reducing is effected by means of water gas the composition of which is adjusted in such a manner by appropriately controlling the operation of the generator, that the excess of heat due to the reduction by the carbon monoxide compensates for the heat necessary for the reduction by the hydrogen as well as for the losses by radiation and by conduction of the reducing chamber.

It has been found that it was particularly advantageous to use a gas having the following composition: 40,5% of CO, 50,5% of $H_2$, 4% of $N_2$, 5% of $CO_2$, said composition being obtained by means of a gas generator which is usual in gas works.

Owing to this choice of the reducer gas, the temperature of the reducing chamber always remains constant so that it becomes unnecessary to heat or to cool said chamber.

In the known methods using spongy iron, the fresh charge introduced into the reducing chamber is pre-heated by the used up gases to the reducing temperature. As the carbon monoxide contained in the gases is decomposed at about 700° C., into carbon dioxide and finely divided solid carbon, the fine particles of carbon clog the pores of the ore and hinder the access of the reducer gas. In the present invention the reducer gas which is enriched in $CO_2$, or in $CO_2$ and in $H_2O$, is removed from the reducing chamber at the reducing temperature, i. e. at 900–1100° C. whereas the pre-heating of the charge of ore is effected in another manner. In the above indicated equations, the coefficient $n$, which varies somewhat according to the temperature, is generally equal to 4 or 5, so that only a portion, say about 20%, of the gases conveyed to the reducing chamber is actually oxidized, while the main portion of said gases passes without having been altered, the composition of the discharged gases being determined by a balanced chemical state which is dependent on the temperature. To effect the reduction at a practically sufficient rate and at the relatively limited maximum temperature above indicated, it is necessary to convey a large amount of gas through the charge of ore. The relative carbon dioxide or hydrogen content therefore only increases to a slight extent so that the gas still retains its entire value as a fuel when it issues from the reducing chamber. Said gas is then conveyed to the hearth of the Siemens-Martin furnace in the heating chamber of which it had been heated prior to being used for the reducing operation, and it serves to produce the amount of heat necessary for smelting the spongy iron in the reducing chamber to pure iron and slag.

The iron thus produced can, after the smelting process, be mixed with carbon, alloyed and deoxidized in the known manner with ferro-vanadium, ferro-silicon or ferro-manganese. It is furthermore possible to charge the crucible of the Siemens-Martin furnace with solid or liquid cast iron or with bundles of scrap iron at the same time as with the spongy iron.

When the reducing chamber is supplied with poor ore, it is advisable to interpose a magnetic treatment between the production of the spongy iron and the smelting in the Siemens-Martin furnace so as to reduce the amount of slag.

It is possible to produce spongy iron economically in the above indicated manner and to transform it into iron or steel. Apart from this economical advantage, the method which is the object of the invention enables a substantial improvement to be obtained in the quality of the iron or steel produced as regards the yield point and the toughness owing to the fact that the reducing gases can be previously desulphurized in a manner which is moreover known per se.

The above arrangements therefore enable iron and steel to be produced which are free from sulphur and consequently are of the same value as charcoal iron; they are therefore particularly suitable for all uses where a high yield point and great toughness are necessary, for example for sheet to be pressed, tubes, thin wire and the like, as well as for high priced alloys and, after an optional treatment in an electric furnace, for tools and building steels which are likely to undergo great strains, for armour plates, etc.

By way of example, an embodiment of a steel producing plant according to the invention is described hereinafter and illustrated in the accompanying drawings.

Fig. 2 is the corresponding plan view.

Figure 1:
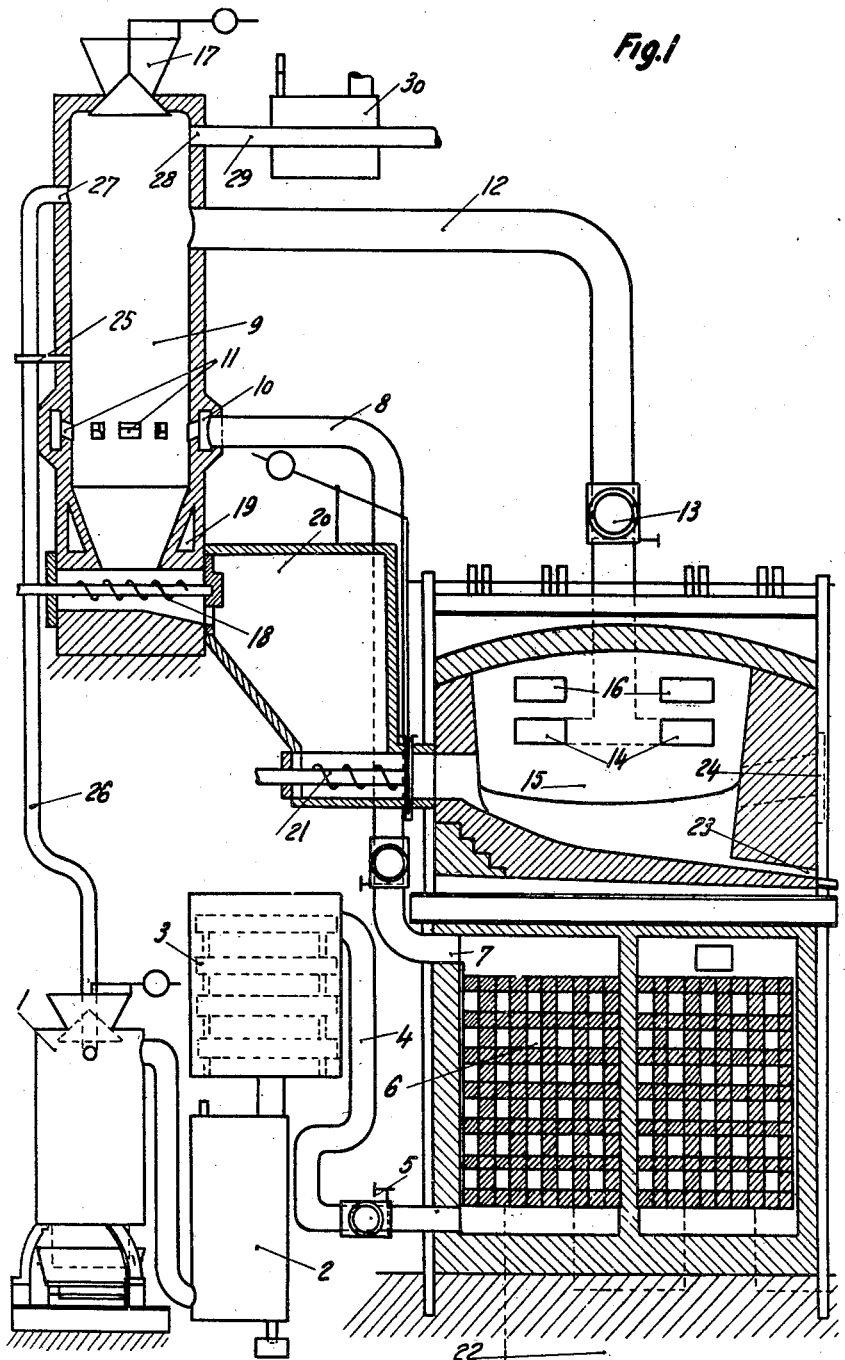
Fig. 1 is a diagrammatic view in sectional elevation of a plant for carrying out the method according to the invention.

In the drawings, I designates the gas generator, 2 is a washing device for separating the tar and the dust, 3 the desulphurization device. Thence, the gas is conveyed through the pipe 4 into the pre-heating chamber 6 of the Siemens-Martin furnace, the control cock 5 supplying the two heating chambers of the furnace alternately, in known manner. After passing through the preheating chamber 6 where it is heated to 900–1100° C.; the gas flows out through the opening 7, which is closed by valves or cocks, preferably connected to the aforesaid control cock 5, into the pipe 8 and into the reducing chamber 9 into which it penetrates through the annular duct 10 and the grooves 11. After passing through the layer of ore herein and effecting the work of reducing, the gas is sent through the pipe 12 and the opening 14 into the hearth 15 of the furnace, whereas the combustion air which is heated in the heating chambers located adjacent the heating chambers for the gas, penetrates into the openings 16. The burnt gases are exhausted on the opposite side in the usual manner in Siemens-Martin furnaces and are conveyed through the heating chambers and then escape through the flue 22 into the chimney.

The ore is introduced into the reducing chamber 9 through the bell 17 and removed from said chamber by the device 18 as spongy iron, after reducing is complete. As the spongy iron leaves the reducing chamber at a temperature of 800–850°, it is advisable, in order to protect the propelling device 18, and to avoid a fresh oxidation, to cause cooling to take place, which is effected by means of a water or air cooling device 19. The spongy iron issuing from the reducing chamber is conveyed to the crucible of the Siemens-Martin furnace. The reducing chamber operates continuously whereas the Siemens-Martin furnace has to be supplied intermittently so that it is advisable to arrange between the reducing chamber and the Siemens-Martin furnace, a hopper 20 from which the spongy iron is brought to the crucible 15 by the device 21. The hopper 20 is insulated on the outside to avoid fresh losses of heat and it is gas-tight to avoid losses of gas during the operation of the device 18. Furthermore, by this means the reducer gas occluded in the pores of the spongy iron, adheres to the latter and accelerates the melting in the Siemens-Martin furnace. The molten iron or steel is removed from the furnace through the outlet hole 23. For introducing the charges, the deoxidizing means and the alloy metals, the opening 24 has been provided.

In order to raise the charge to the necessary temperature before starting to reduce the ore in the reducing chamber 9, a closable pipe 25 has been provided in which air is blown so that the gas can burn. When the temperature necessary for effecting the reducing has been attained, the air inlet is closed and the reducing process itself supplies the amount of heat necessary for maintaining the temperature.

As above indicated, the reducing gases are exhausted through the pipe 12 at a temperature of about 900–1000° C. so as to avoid decomposition of the carbon monoxide. To pre-heat the charge of ore to the reducing temperature, the same gas is taken from the generator and conveyed through the pipe 26 and the opening 27 to the upper part of the reducing chamber. Said gas is exhausted from the reducing chamber through the pipe 28.

As its temperature is at that time still about 700° C., its substantial heat is recuperated in the boiler 30. In the event of the pressure in the inlet opening 27 and in the pipe 12 being the same, no mixture of gases occurs. In the event of water gas being used for reducing the ore, the charge is pre-heated by the hot gases produced by the generator during the heating period of same when hot air is blown onto the coke in order to heat it to a temperature of 1300° C. Said gases contain about 15% of carbon monoxide and they are mixed with the air in a chamber (not shown) and ignited. The heat produced by the combustion and the substantial heat of the gas heat the charge to about 900° C.

I claim:

1. A method for preparing iron and steel wherein the ore is treated in a chamber with a reducing gas and then smelted in a furnace of the Siemens-Martin type, comprising pre-heating the reducing gas in the recuperation chambers of the Siemens-Martin furnace and utilizing the gases issuing from the reducing chamber as fuel for heating said furnace.

2. A method for preparing iron and steel wherein the ore is treated in a chamber with a reducing gas and then smelted in a furnace of the Siemens-Martin type, comprising using water gas for reducing the ore, controlling the proportion of hydrogen and carbon monoxide of said gas in such a manner that the heat produced by the reduction of the iron oxide by the carbon monoxide is sufficient to compensate for the heat absorbed by the reduction of the iron oxide by the hydrogen as well as for the losses by conduction or by radiation, heating said reducing gas in the recuperation chambers of the Siemens-Martin furnace, and utilizing the gas issuing from the reducing chamber as fuel for heating said furnace.

3. A method for preparing iron and steel wherein the ore is treated in a chamber with a reducing gas and then smelted in a furnace of the Siemens-Martin type, comprising using water gas for reducing the ore, controlling the proportion of hydrogen and of carbon monoxide of said gas in such a manner that the heat produced by the reduction of the iron oxide by the carbon monoxide is sufficient to compensate for the heat absorbed by the reduction of the iron oxide by the hydrogen as well as for the losses by conduction or by radiation, desulphurizing the reducing gas, heating same in the recuperation chambers of the Siemens-Martin furnace, and utilizing the gas issuing from the reducing chamber as fuel for heating said furnace.

4. A method for preparing iron and steel wherein the ore is treated in a chamber with a reducing gas and then smelted in a furnace of the Siemens-Martin type, comprising producing a water gas in a gas generator, heating with the hot draught gases of said gas generator the fresh charge of ore introduced in the reducing chamber, heating the reducing water gas in the recuperation chambers of the Siemens-Martin furnace, and utilizing the gases issuing from the reducing chamber as fuel for heating said furnace.

5. A method for preparing iron and steel wherein the ore is treated in a chamber with a reducing gas and then smelted in a furnace of the Siemens-Martin type, comprising using water gas produced in a gas generator for reducing the ore, heating with the hot draught gases of said gas generator the fresh charge of ore introduced into the reducing chamber, controlling the proportion of the hydrogen and of the carbon monoxide of said gas in such a manner that the heat produced by the reduction of the iron oxide by the carbon monoxide is sufficient to compensate for the heat absorbed by the reduction of the iron oxide by the hydrogen as well as for the losses by conduction or by radiation, heating said reducing gas in the recuperation chambers of the Siemens-Martin furnace, and utilizing the gas issuing from the reducing chamber as fuel for heating said furnace.

6. A method for preparing iron and steel wherein the ore is treated in a chamber with a reducing gas and then smelted in a furnace of the Siemens-Martin type, comprising producing a water gas in a gas generator, mixing the hot draught gases of the gas generator with air, igniting the mixture and utilizing the burnt gases for heating the fresh charge of ore introduced into the reducing chamber, heating the reducing water gas in the recuperation chambers of the Siemens-Martin furnace, and utilizing the gases issuing from the reducing chamber as fuel for heating said furnace.

7. A method for preparing iron and steel wherein the ore is treated in a chamber with a reducing gas and then smelted in a furnace of the Siemens-Martin type, comprising producing a water gas in a gas generator, heating with the hot draught gases of said gas generator the fresh charge of ore introduced into the reducing chamber, discharging separately said preheating gas, heating the reducing water gas in the recuperation chambers of the Siemens-Martin furnace, adjusting the pressure at which the heating gases are introduced into the reducing chamber so that said pressure is equal to the pressure of the reducing gases as they are exhausted from said reducing chamber, and utilizing the gases issuing from the reducing chamber as fuel for heating said Siemens-Martin furnace.

8. A method for preparing iron and steel wherein the ore is treated in a chamber with a reducing gas and then smelted in a furnace of the Siemens-Martin type, comprising pre-heating the reducing gas in the recuperation chambers of the Siemens-Martin furnace, conveying said heated gases into the reducing chamber, conveying into said chamber, at the same time as the ore and the reducing gases, combustion air to start the reduction, and stopping this inlet of air when the reducing temperature is attained.

9. A method for preparing iron and steel wherein the ore is treated in a chamber with a reducing gas and then smelted in a furnace of the Siemens-Martin type, comprising pre-heating the reducing gas in the recuperation chambers of the Siemens-Martin furnace and utilizing the gases issuing from the reducing chamber as fuel for heating said furnace, and conveying the reduced ore, shielded from the air, from the reducing chamber into the furnace.

10. Device for preparing iron and steel, comprising a reducing chamber, a gas generator producing a reducing gas, a Siemens-Martin furnace, means for heating in the recuperation chambers of said furnace the reducing gas produced in the gas generator, means for conveying these heated gases into the reducing chamber, means for utilizing the gases issuing from said chamber as fuel for heating the furnace, an intermediate air-tight hopper arranged between the reducing chamber and the furnace, air tight means for continuously removing the spongy iron from the reducing chamber to the intermediate hopper, and air-tight means for intermittently conveying the spongy iron from the intermediate hopper into the furnace.

JOHN ELIAN.